April 13, 1965     W. K. PRIESE     3,177,887
BALL VALVE HAVING HEAT DESTRUCTIBLE SEAL
Filed Oct. 26, 1960
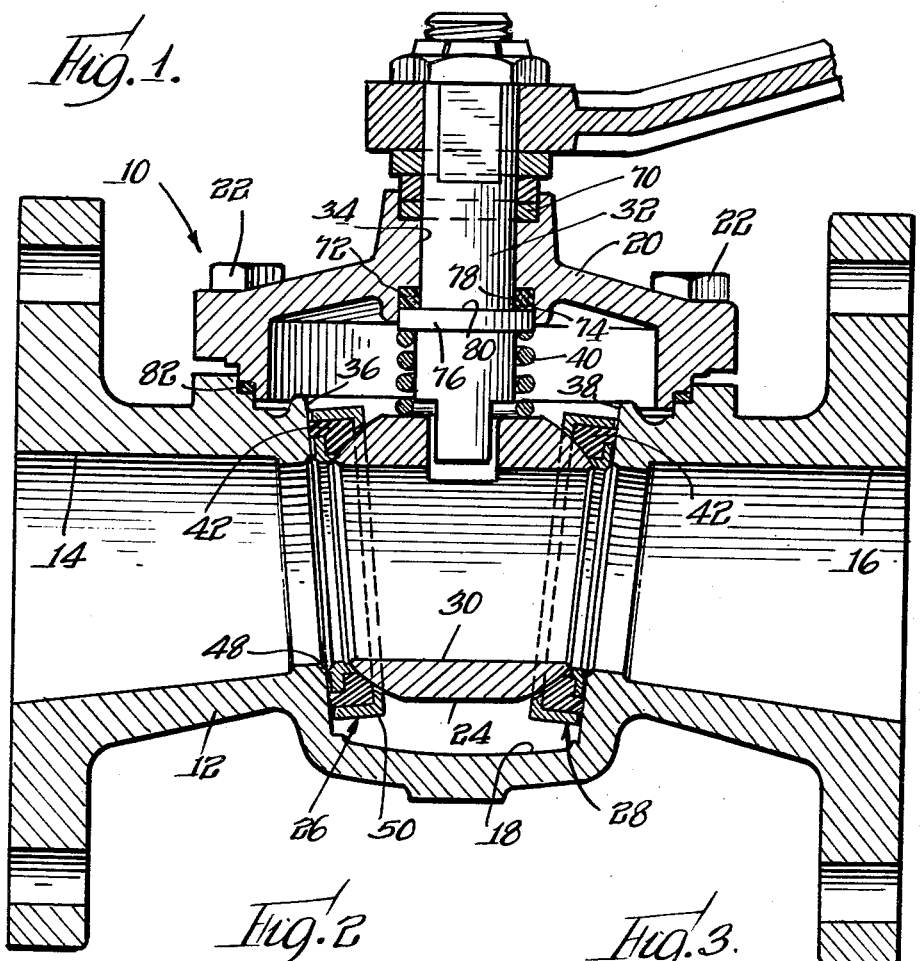
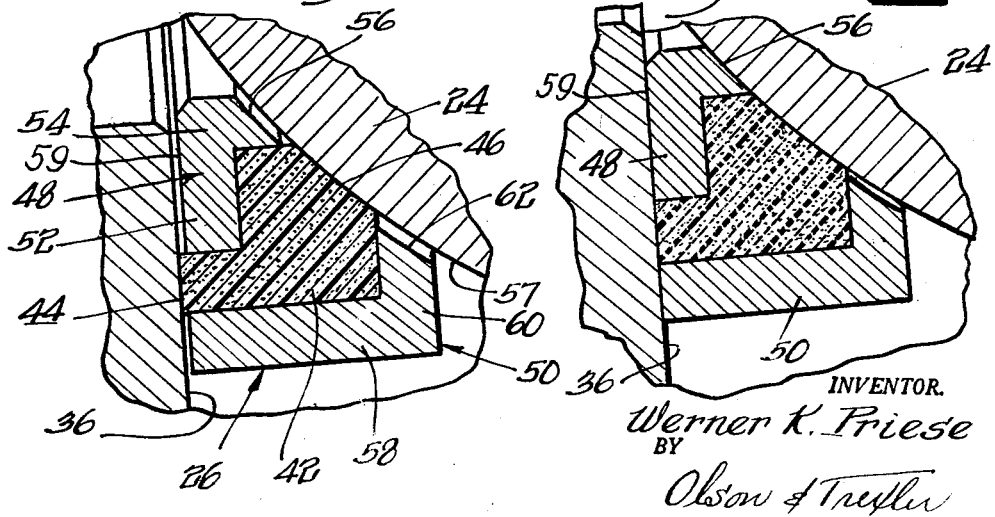
INVENTOR.
Werner K. Priese
BY
Olson & Trexler
attys.

United States Patent Office 3,177,887
Patented Apr. 13, 1965

3,177,887
BALL VALVE HAVING HEAT DESTRUCTIBLE SEAL
Werner K. Priese, Barrington, Ill., assignor to Hills-McCanna Company, Chicago, Ill., a corporation of Illinois
Filed Oct. 26, 1960, Ser. No. 65,180
5 Claims. (Cl. 137—74)

The present invention relates to flow control valves, particularly ball valves.

One object of the invention is to provide a new and improved ball valve which affords many advantages in normal service, while at the same time serving effectively to block the escape of fluid through the valve in the event the valve is subjected to intense heat in a fire or the like.

Another object is to provide a ball valve having an improved construction which normally seals the valve to great advantage by engagement of the valve ball with a relatively soft valve seat material that is subject to destruction by abnormally high temperatures, while at the same time providing effective assurance against failure of the valve in the event that it is exposed by fire or otherwise to abnormally high temperatures sufficient to destroy the effectiveness of the relatively soft seat material which normally engages and forms a seal with the valve ball.

A further object is to provide an improved ball valve of the character recited in the proceding objects which has an improved construction which is capable of preventing the flow of any appreciable quantity of fluid through the valve, and which effectively precludes the escape of any appreciable quantity of fluid from the valve in the event the valve is subjected by fire or otherwise to very high temperatures.

Another object is to achieve the several objects previously recited in a new and improved ball valve which is simple in construction and inherently well adapted to be economically manufactured and readily serviced in the field.

Other objects and advantages will become apparent from the following description of the exemplary embodiment of the invention illustrated in the drawings, in which:

FIGURE 1 is a longitudinal sectional view of a ball valve forming the exemplary embodiment of the invention illustrated;

FIG. 2 is a fragmentary sectional view on a greatly enlarged scale, illustrating the normal relationship of the valve ball to a coacting valve seat and its support structure, the ball being shown in its valve closing position; and FIG. 3 is a fragmentary sectional view similar to FIG. 2, illustrating the relationship of the valve ball to coacting seat structure in the event the valve is subjected to temperatures sufficiently high to destroy or vaporize the valve seat structure which normally engages and seals against the ball.

Referring to the drawings in greater detail, the improved ball valve 10 forming the exemplary embodiment of the invention illustrated, comprises a valve body or housing 12 defining two opposed fluid passages 14, 16 opening into an internal valve chamber 18 formed within the valve body. The internal chamber 18 opens upwardly, with reference to FIG. 1, through one side of the valve body 12. This upwardly open side of the chamber 18 is covered by a removable valve bonnet 20 secured to the valve body by a plurality of stud bolts or cap screws 22.

A flow control ball 24 rotatably mounted in the chamber 18 between the inner ends of the passages 14, 16 is engaged on opposite sides by a pair of annular valve seats 26, 28 supported in encircling relation to the inner ends of the passages.

The ball 24 is rotated between valve open and valve closed positions to bring an internal bore 30 into and out of alinement with the passages 14, 16 by means of an operating stem 32 nonrotatably connected to the ball and extending out through a bore 34 in the top of the bonnet 20.

In the preferred construction shown, the two valve seats 26, 28 are slidably supported on two flat seat support surfaces 36, 38 formed on the body 12 in encircling relation to the inner ends of the passages 14, 16. The two support surfaces 36, 38 are inclined, as shown in FIG. 1, to converge toward each other in a downward direction. The ball 24 and seats 26, 28 are urged in the direction in which the surfaces 36, 38 converge by a coiled compression spring 40 encircling the inner end of the stem 32 and engaging the ball 24.

Each of the annular valve seats 26, 28 comprises an annular seal 42 formed of a relatively soft deformable material which engages both the ball and the adjacent one of the support surfaces 36, 38 to form a highly advantageous seal between the ball and the body structure encircling the adjacent one of the passages 14, 16. A most suitable material for use in forming the annular seal 42 is polytetrafluoroethylene, sold under the trade name Teflon.

Each seal 42 defines a flat, annular base surface 44 which slidably engages the coacting one of the support surfaces 36, 38. Each annular seal 42 also defines a somewhat concave annular face surface 46 adapted to conform to and seal against the opposing spherical surface of the ball 24.

The annular seal 42 of each valve seat 26, 28 is to a large extent confined between two restrictive rings 48, 50, each of which is generally L-shaped in transverse section, as shown in FIG. 2. Both the rings 48, 50 are concentric with the annular seal 42 and generally engage and limit the inner and outer peripheries, respectively, of the seal.

Having reference to the structure of the seat 26 illustrated in FIG. 2, which is identical to the structure of the seat 28, it will be noted that the inner ring 48 includes a radial leg 52 of substantial length, extending along the support surface 36. A short ball sealing lip 54, integral with the inner edge of the ring leg 52, extends axially with respect to the ring 48 toward the ball 24, as shown. The projecting end of the sealing lip 54 defines a truncated conical sealing surface 56 which stops short of tangential engagement with the opposing cylindrical surface 57 of the valve ball.

The outer ring 50 of the seat 26 comprises a cylindrical element 58, encircling the outer periphery of the seal 42, and includes a lip 60 extending radially inward with respect to the seat 26 from the edge of the element 58 more remote from the surface 36. The inner edge of the lip 60 defines a truncated conical surface 62 which stops short of tangential engagement of the opposing ball surface 57.

The inner and outer rings 48, 50 thus formed largely confine the intervening annular seal 42 against radial displacement in either a radially inward or radially outward direction, upon being subjected to compressive loads in sealing the valve, as will presently appear.

As shown in FIGS 1 and 2, a portion of the seal 42 extends axially toward the support surface 36 between the rings 48, 50 and projects axially a substantial distance beyond the ring leg 52 and the ring element 58 to define the previously mentioned surface 44. In a somewhat similar manner, the generally opposite side of the seal 42 projects beyond the surfaces 56, 62, to define the previously mentioned ball opposing surface 46 which projects from the rings 48, 50 toward the center of the ball 42.

Normally, the projecting surfaces 44, 46 of the Teflon seal 42 firmly engage the support surface 36 and the ball surface 57 to form a highly effective seal against both these surfaces, while at the same time supporting the ball 24 out of contact with both of the rings 48, 50 and avoiding substantial pressure engagement of the rings with the surface 36.

The seal thus formed by the seats 26, 28 between the ball 24 and the inner ends of the passages 14, 16 provides many advantages during normal use of the valve. The seals are highly effective and reliable over a long service life of the valve.

However, the relatively soft material of the seal elements 42, in this instance Teflon, is subject to effective destruction and even vaporization when subjected to very high abnormal temperatures which might be encountered when the valve is exposed to a fire, for example. In this event, the seals 42 or the seats 26, 28 would fail. Yet, even in the event of a complete failure of the seals 42 in a fire, the improved valve 10 remains effective to preclude the passage of any substantial quantity of fluid through the valve.

Thus, in the event the seal 42 of the seat 26, for example, is vaporized or destroyed by heat, the spring 40 tends to force the ball 24 downwardly toward the converging ends of the suport surfaces 36, 38, to cause the ball surface 57 to engage the conical surface 56 on the inner ring 54. Moreover, with the ball 24 in its closed position, the pressure of fluid on the ball, which is free to move somewhat in relation to the stem 32, will move the ball into firm circumferential engagement with the ring surface 56 and force the ring 54 firmly into engagement with the surface 36.

It will be noted that the shaping of the ring lip 54 is such that the lip 54 defining the surface 56 is subjected to a compressive load which enables the structure defining the surface 56 to withstand substantial load even though it is weakened by higher temperatures. At this point, it is assumed that the higher fluid pressure is within the passage 16 and tends to force the ball 24 against the seat 26. If the higher fluid pressure is in the passage 14, the ball will be forced against the seat 28 which includes sealing structure identical to that in the seat 26.

Being free to move toward and against the downstream one of the seats 26, 28 in response to fluid pressure, the ball 24 applies to the downstream seat a force generally parallel to the axis of the downstream seat. Put another way, the force of fluid pressure on the ball 24, as transmitted by the ball to the downstream seat, is generally perpendicular to the medial plane of the downstream seat and to the support surface 36 or 38 supporting the downstream seat.

Assuming, for example, that the seat 26 is on the downstream side of the ball 24, the force applied by the ball to the downstream seat 26 upon overheating of the seat seal 42 is sustained, as previously indicated, by compresive forces in the structure of the ring 48 defining and supporting the metal seat surface 56 engaged by the ball. When the force of fluid pressure on the ball 24 is sustained by the surface 56, the ring 48 is supported by a base surface 59 on the ring 48 that confronts and rests against the adjacent support surface 36 on the valve body. Compressive loading of the ring structure defining the seat surface 56 and supporting the seat surface 56 against the force of fluid pressure on the ball 24 is achieved by the ball seat structure described and illustrated which produces a radially overlapping relationship between the seat surface 56 and the adjacent support surface 36 on the valve body and a radially overlapping relationship between the seat surface 56 and the ring base surface 59 that coacts with the support surface 36 to support the ring 48 as illustrated and described. The word "radial" as just used to describe the "radially" overlapping relationship of the surfaces referred to has reference to a "radial" direction from the center of the corresponding seat 26. The radially overlapping relationship of the seat surface 56 to both the ring base surface 59 and the support surface 36 extends all the way around the adjacent passage 14 into the valve chamber 18. The same relationships apply to the structure associated with the seat 28 which, as previously indicated, is identical to the seat 26.

The firm engagement of the ring 54 on the low pressure side of the valve with both the ball 24 and the underlying seat support surface in the absence of the adjacent seal 42 effectively blocks the passage of fluid through the valve even in the event of fire. See FIG. 3. Moreover, the advantages stemming from the capability of the improved valve effectively to block the flow of fluid through the valve, even in the event of failure of the Teflon ball seals 42, are further enhanced by forming the seals of a yieldable seal material, such for example as Teflon, in which is dispersed an infusible inorganic material in pulverous form constituting approximately twenty to thirty percent of the seals by volume. Alumina is a most suitable material for dispersion in the yieldable bodies of the seals. Teflon incorporating a dispersion of an infusible material is commercially available from the Polymer Corporation, Reading, Pennsylvania, under the trade name "Fluorsint."

When the ball seals 42 of the improved valve are formed of Teflon incorporating a dispersion of an infusible material, vaporization or other effective destruction of the Teflon body of a seal due to exposure to excessive heat leaves the infusible pulverous material as residue in the space occupied by the seal. In the event of any incipient outflow of fluid through this space, the infusible residue collects adjacent the interfaces between the adjacent ring 54 and the ball 24 and the coacting seat support surface where the infusible material serves to seal off any leakage past the ring.

Assuming the valve to be closed against upstream fluid pressure and the valve seat 26, for example, to be located on the downstream side of the ball 24, the ball 24 will move into engagement with the seat surface 56, in the event of destructive overheating of the seat seal 42, as soon as the strength of the seat seal 42 has been weakened by overheating to the extent that it is no longer capable of sustaining the force of fluid pressure on the ball 24 and holding the ball away from the seat surface 56.

Hence, it will be appreciated that engagement of the ball 24 with the seat surface 56 and engagement of the ring surface 59 with the support surface 36 occurs in response to loss of strength of the seat seal 42. At the time this occurs, the space in the valve chamber 18 around the ball 24 is filled with fluid under pressure, the upstream seat 28 being rendered ineffective to form a fluid tight seal with the ball 24.

The fluid under pressure in the valve chamber 18 acts immediately on the weakened seat seal 42 to urge the seat seal toward the interfaces between the ball 24 and the surface 56 and between the surfaces 59 and 36 as soon as the weakened seal 42 allows the ball 24 to engage the surface 56 and to force the surface 59 against the surface 36. Moreover, the fluid under pressure in the chamber 18 continues to urge the structural material of the seat seal 42 in a downstream direction against the structure defining the opposed surfaces 59, 36, the seat surface 56 and the opposing portion of the ball 24.

In the event of outward seepage of fluid through any interstices existing between the surfaces 59, 36 or between the seat surface 56 and the ball, the structural material of the seat seal 42 is forced by fluid pressure into the interstices to stop the fluid seepage.

Having reference to a seat seal 42 incorporating a dispersion of infusible inorganic material, as described, it will be appreciated that destruction by heat of that component of the seal subject to destruction by high temperature normally would not occur instantly but would take place progressively to an extent depending on the degree to which the seat is heated. As deterioration of its material component, subject to deterioration by high temperature, progresses; the deteriorating seat seal is continuously urged by fluid pressure on its upstream side toward the structure defining the fire seat surface 56. Destruction of the structural material of the seat seal is never complete because of the practical indestructibility by high temperature of the infusible inorganic component of the seat seal, which component becomes more concentrated as the heat destructible component is effectively destroyed.

Since the structural material of the seat seal has an indestructible component of inorganic infusible material and is forced by upstream fluid pressure into any interstices between the surfaces 59, 36 or between the seat surface 56 and the ball, it is effective to block any such interstices against the seepage of fluid through the closed valve even in the event of heating so severe as to cause complete destruction of the component of the seat seal that is subject to destruction by high temperature.

This capability of the valve to remain effective in a fire is of great advantage in refineries and other chemical plants where a valve failure in a fire could greatly magnify the seriousness of the fire.

The escape of fluid from the valve in the event of a fire is effectively precluded by the structural relationship of the valve stem 32 to the bonnet 20. Normally, the escape of fluid along the valve stem is precluded by an outer annular seal 70 and an inner annular seal 72 encircling the valve stem. Both these seals are subject to vaporization by heat. However, the inner seal 72 is contained within a counter bore or annular cavity 74 formed in the bonnet at the inner end of the bore 34. An annular shoulder 76 formed on the stem 32 fits within the inner end of the cavity 74 which has a generally cylindrical shape and a flat bottom 78 adapted to co-mate with a flat annular opposing surface 80 on the shoulder 76.

In the event of vaporization of the seal 72, the pressure of fluid within the valve chamber 18 tends to force the stem 32 axially outward, causing the shoulder surface 80 to bottom against the surface 78 of the recess or well 74. This mutual engagement of the two surfaces 78 and 80, together with the close fit of the shoulder 76 within the recess 74, effectively precludes the escape of any substantial quantity of fluid along the stem 32. The advantages of the stem seal thus provided are maximized by forming the seal 72 from the previously described material used in the ball seals 42; i.e., Teflon incorporating a dispersion of an infusible material. In the event of destruction of the Teflon body of the seal 72, the shoulder 76 moves the infusible residue against the bottom of the well 74 where it serves to perfect the seal against the outflow of fluid along the stem 32.

The peripheral edge of the bonnet 20 is effectively sealed to the body 12 by an annular, metal-asbestos gasket 82 which is not subject to failure, even when exposed to extremely high temperatures.

It will be appreciated that the invention is not necessarily limited to use of the particular valve structure illustrated, but includes the use of variants and alternatives within the scope of the invention as defined by the claims.

The invention is claimed as follows:

1. A fireproof ball valve comprising, in combination, a valve body defining a valve chamber and defining two passages opening into said chamber, said body defining two flat seat support surfaces encircling the inner ends of said respective passages and converging in one direction, a rotary valve ball disposed within said chamber, two annular valve seats slidably positioned on said respective support surfaces and engaging opposite sides of said ball, an operator element connected to rotate said ball between open and closed positions, said ball being movable with respect to both said operator element and said body to move under the force of fluid pressure on the ball toward the inner end of either of said passages, each valve seat comprising an annular seal formed of a yieldable material defining a base surface slidably engaging the adjacent support surface and defining an annular face surface slidably engaging the ball, each seat including an annular seat ring of metal concentric with the seat seal and bounding one peripheral edge of the seal, each seat seal being dimensioned to support the ball out of contact with the adjacent seat ring, each seat ring defining an annular fire seat surface and an annular base surface respectively confronting directly said ball and the adjacent support surface to engage the ball and the adjacent support surface respectively to prevent excessive leakage through the valve upon destruction of the adjacent seat seal, said metal seat ring of each seat being shaped and dimensioned to produce between the fire seat surface on the ring and the adjacent support surface a radially overlapping relationship which extends all the way around the adjacent passage, said metal seat ring of each seat being shaped and dimensioned to produce between the annular fire seat surface and the annular base surface on the ring a radially overlapping relationship which extends all the way around the adjacent passage, and a spring urging said ball in the direction in which said support surfaces converge.

2. A fireproof ball valve comprising, in combination, a valve body defining a valve chamber and defining two passages opening into said chamber, said body defining two smooth seat support surfaces encircling the inner ends of said respective passages and converging in one direction, a rotary valve ball disposed within said chamber, two annular valve seats positioned on said respective support surfaces and engaging opposite sides of said ball in encircling relation to the inner ends of said respective passages, an operator element connected to rotate said ball between open valve and closed valve positions, said ball being movable with respect to both said operator element and said body to move within said chamber under the force of fluid pressure on the ball toward the inner end of either of said passages, each valve seat comprising an annular seal formed of a yieldable material defining a base surface engaging the adjacent support surface and defining an annular face surface engaging the ball, each seat including an annular seat ring of metal concentric with the seat seal and bounding one peripheral edge of the seal, each seat seal being dimensioned to support the ball out of contact with the adjacent seat ring, each seat ring defining a smooth annular fire seat surface and a smooth annular base surface respectively confronting directly said ball and the adjacent support surface to engage the ball and the adjacent support surface respectively to prevent excessive leakage through the valve upon destruction of the adjacent seat seal, said metal seat ring of each seat being shaped and dimensioned to produce between the fire seat surface on the ring and the adjacent support surface a radially overlapping relationship which extends all the way around the adjacent passage, said annular metal ring of each seat being shaped and dimensioned to produce between the annular fire seat surface and the annular base surface on the ring a radially overlapping relationship which extends all the way around the adjacent passage, and means for applying to said ball and said seats a force in the direction in which said seat support surfaces converge.

3. A fireproof ball valve comprising, in combination, a valve body defining a valve chamber and defining two passages opening into said chamber, said body defining two seat support surfaces encircling the inner ends of said respective passages and converging in one direction, a rotary valve ball disposed within said chamber, two annular valve seats positioned on said respective support surfaces and engaging opposite sides of said ball in encircling relation to the inner ends of said respective passages, an operator element connected to rotate said ball between open and closed positions, said ball being movable with respect to both said operator element and said body to move within said chamber under the force of fluid pressure on the ball toward the inner end of either of said passages, each valve seat comprising an annular seal engaging the ball and being formed of a material subject to deterioration under abnormally high temperatures, each seat including an annular seat ring of metal concentric with the seat seal and bounding one peripheral edge of the seal, said seal of each seat being dimensioned to support the ball out of contact with the adjacent seat ring, the seat ring of each seat defining an annular fire seat surface and an annular base surface respectively confronting directly said ball and the adjacent support surface to engage the ball and the adjacent support surface respectively to prevent excessive leakage through the valve upon destruction of the adjacent seat seal, said metal seat ring of each seat being shaped and dimensioned to produce between the fire seat surface on the ring and the adjacent support surface a radially overlapping relationship which extends all the way around the adjacent passage and to produce between the annular fire seat surface and the annular base surface on the ring a radially overlapping relationship which extends all the way around the adjacent passage whereby the seat ring is subjected by the ball to a loading which is essentially compressive in the event of failure of the adjacent seat seal and movement of the ball against the seat ring by force on the ball of fluid under pressure within the valve chamber, and means for applying to said ball and said seats a force in the direction in which said seat support surfaces converge.

4. A fireproof ball valve comprising, in combination, a valve body defining a valve chamber and defining two passages opening into said chamber, said body defining two seat support surfaces encircling the inner ends of said respective passages and converging in one direction, a rotary valve ball disposed within said chamber, two annular valve seats positioned on said respective support surfaces and engaging opposite sides of said ball in encircling relation to the inner ends of said respective passages, an operator element connected to rotate said ball between open valve and closed valve positions, said ball being movable with respect to both said operator element and said body to move under the force of fluid pressure on the ball toward the inner end of either of said passages, each valve seat comprising an annular seal formed of a material subject to deterioration under abnormally high temperatures, said seat seal of each seat defining an annular face surface directly confronting and engaging the ball, each seat including an annular ring of metal concentric with the seat seal and bounding the inner peripheral edge of the seal, said seal of each seat being dimensioned to support the ball out of contact with the adjacent seat ring, said seat ring of each seat defining an annular fire seat surface and an annular base surface respectively confronting directly said ball and the adjacent support surface to engage the ball and the adjacent support surface respectively to prevent excessive leakage through the valve upon destruction of the adjacent seat seal, said metal seat ring of each seat being shaped and dimensioned to produce between the fire seat surface on the ring and the adjacent support surface a radially overlapping relationship which extends all the way around the adjacent passage and to produce between the annular fire seat surface and the annular base surface on the ring a radially overlapping relationship which extends all the way around the adjacent passage whereby the seat ring is subjected by the ball to a loading which is essentially compressive in the event of failure of the adjacent seat seal and movement of the ball against the seat ring by force on the ball of fluid under pressure within the valve chamber; and said seat seal of each seat incorporating therein a dispersion of an inorganic infusible material which serves, in the event of destructive deterioration of said seat seal by high temperature, to caulk against outward leakage any small interstices existing between said ball and the adjacent seat ring fire seat surface and any small interstices existing between said support surface and the adjacent seat ring base surface, said inorganic infusible material being moved into caulking relation to said interstices respectively by any incipient outflow of fluid through the respective interstices.

5. A fireproof ball valve comprising, in combination, a valve body defining a valve chamber and defining two passages opening into said chamber, a rotary valve ball disposed within said chamber, two annular valve seats engaging said ball in encircling relation to the inner ends of said respective passages, an operator element connected to rotate said ball between open valve and closed valve positions, said ball being movable with respect to both said operator element and said body to move under the force of fluid pressure on the ball toward the inner end of either of said passages, each valve seat comprising an annular seal formed of a material subject to deterioration under abnormally high temperatures, said seat seal of each seat defining an annular face surface directly confronting and engaging the ball, each seat including an annular metal element concentric with the seat seal and bounding the inner peripheral edge of the seal, said seal of each seat being dimensioned to support the ball out of contact with the adjacent annular metal element, said metal element of each seat defining an annular fire seat surface directly confronting said ball to engage the ball to prevent excessive leakage through the valve upon destruction of the adjacent seat seal; said metal element of each seat being shaped and dimensioned to produce between the fire seat surface on the metal element and the adjacent structure of the valve body, which encircles the adjacent passage, a radially overlapping relationship which extends all the way around the adjacent passage whereby the structure of said metal element defining and supporting said fire seat surface radially overlaps and is supported by the adjacent structure of the body all the way around the adjacent passage so that the metal element is subjected by the ball to a loading which is essentially compressive in the event of failure of the adjacent seat seal and movement of the ball against the fire seat surface on said metal element by force on the ball of fluid under pressure within the valve chamber; and said seat seal of each seat incorporating therein a dispersion of an inorganic infusible material which serves, in the event of destructive deterioration of the seat seal by high temperature, to caulk against outward leakage any small interstices existing between said ball and said fire seat surface on said metal element of the seat, said inorganic infusible material being moved into caulking relation to said interstices by any incipient outflow of fluid through the interstices.

References Cited by the Examiner
UNITED STATES PATENTS

| 1,331,025 | 2/20 | Riggin. | |
| 1,738,450 | 12/29 | Ryan | 251—159 |
| 1,941,839 | 1/34 | Johansson | 251—170 |
| 2,700,528 | 1/55 | Blackman | 251—317 X |
| 2,711,302 | 6/55 | McWhorter | 251—317 X |
| 2,942,840 | 6/60 | Clade | 251—315 X |
| 2,963,262 | 12/60 | Shafer | 251—315 X |
| 3,014,690 | 12/61 | Boteler | 251—315 X |
| 3,067,977 | 12/62 | Anderson | 251—317 |

FOREIGN PATENTS

| 403,389 | 12/33 | Great Britain. |
| 507,878 | 6/39 | Great Britain. |

ISADOR WEIL, *Primary Examiner.*

UNITED STATES PATENT OFFICE
CERTIFICATE OF CORRECTION

Patent No. 3,177,887 April 13, 1965

Werner K. Priese

It is hereby certified that error appears in the above numbered patent requiring correction and that the said Letters Patent should read as corrected below.

Column 3, line 16, for "or" read -- of --.

Signed and sealed this 19th day of October 1965.

(SEAL)
Attest:

ERNEST W. SWIDER
Attesting Officer

EDWARD J. BRENNER
Commissioner of Patents